United States Patent
Lin (10) Patent No.: US 9,415,977 B2
(45) Date of Patent: Aug. 16, 2016

(54) CRANE AND APPARATUS FOR MONITORING THE SWING ANGLE, WEIGHT OR GESTURE OF THE CRANE LOAD

(71) Applicant: Handing Lin, Fuzhou (CN)

(72) Inventor: Handing Lin, Fuzhou (CN)

( * ) Notice: Subject to any disclaimer, the term of this patent is extended or adjusted under 35 U.S.C. 154(b) by 0 days.

(21) Appl. No.: 14/649,211

(22) PCT Filed: Mar. 24, 2014

(86) PCT No.: PCT/CN2014/073961
§ 371 (c)(1),
(2) Date: Jun. 3, 2015

(87) PCT Pub. No.: WO2014/201886
PCT Pub. Date: Dec. 24, 2014

(65) Prior Publication Data

US 2015/0344272 A1    Dec. 3, 2015

(30) Foreign Application Priority Data

Jun. 21, 2013  (CN) .......................... 2013 1 0249688

(51) Int. Cl.

| | |
|---|---|
| B66C 23/00 | (2006.01) |
| B66C 13/16 | (2006.01) |
| B66C 1/40 | (2006.01) |
| B66C 13/18 | (2006.01) |
| G01G 19/14 | (2006.01) |
| G01C 9/02 | (2006.01) |
| B66C 13/06 | (2006.01) |

(52) U.S. Cl.
CPC ............... *B66C 23/00* (2013.01); *B66C 13/06* (2013.01); *B66C 13/16* (2013.01); *B66C 13/18* (2013.01); *G01C 9/02* (2013.01); *G01G 19/14* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,815,614 | A | * | 3/1989 | Putkonen .............. B66C 23/905 212/272 |
| 5,359,516 | A | * | 10/1994 | Anderson ............. B66C 23/905 212/238 |
| 6,378,653 | B1 | * | 4/2002 | Takahashi ............. B66F 17/006 182/62.5 |
| 6,553,278 | B2 | * | 4/2003 | Handroos ............. B66C 13/066 212/272 |
| 8,272,521 | B1 | | 9/2012 | Kemmerly et al. |

FOREIGN PATENT DOCUMENTS

| | | |
|---|---|---|
| CN | 201518526 U | 6/2010 |
| CN | 102431897 A | 5/2012 |
| CN | 201686411 U | 12/2012 |

(Continued)

*Primary Examiner* — Yonel Beaulieu
(74) *Attorney, Agent, or Firm* — Gokalp Bayramoglu (57) ABSTRACT

Disclosed in the present invention is a crane, method and apparatus for monitoring the swing angle, weight or gesture of the crane load, belonging to the technical field of crane; the purpose of the present invention is provide an apparatus for monitoring the swing angle, weight or gesture for the crane's hoisting, and to provide a crane which comprises aforesaid apparatus; when hoisting a load, the swing angle, weight or gesture are displayed in both the native crane cab and the collaborative crane cab by wireless transmission and switching channels in the cab; then, not only can the drivers operate the cranes to eliminate the deflection of load and achieve the vertical hoisting according to the load's swing angle of each crane displayed on the screen, but also operate the cranes to make balance of weight distribution according to the real-time ratio of load weight or load gesture.

12 Claims, 2 Drawing Sheets

(56) References Cited

FOREIGN PATENT DOCUMENTS

| | | |
|---|---|---|
| CN | 102219153 B | 6/2013 |
| CN | 103318765 A | 9/2013 |
| DE | 10008235 A1 | 9/2011 |
| JP | 2012037469 A | 2/2012 |

\* cited by examiner

FIG. 1

(Prior Art)

CRANE AND APPARATUS FOR MONITORING THE SWING ANGLE, WEIGHT OR GESTURE OF THE CRANE LOAD

This application claims priority to PCT Application No. PCT/CN2014/073961 filed on Mar. 24, 2014, which claims priority to China patent No. 201310249688.2 filed on Jun. 21, 2013 and granted on Jan. 7, 2015, which are incorporated in their entirety herein by reference.

FIELD OF THE INVENTION

The present application relates to the technical field of crane, and more specifically to a crane, method and apparatus for monitoring the swing angle, weight or gesture of the crane load.

BACKGROUND OF THE INVENTION

Figure 1:
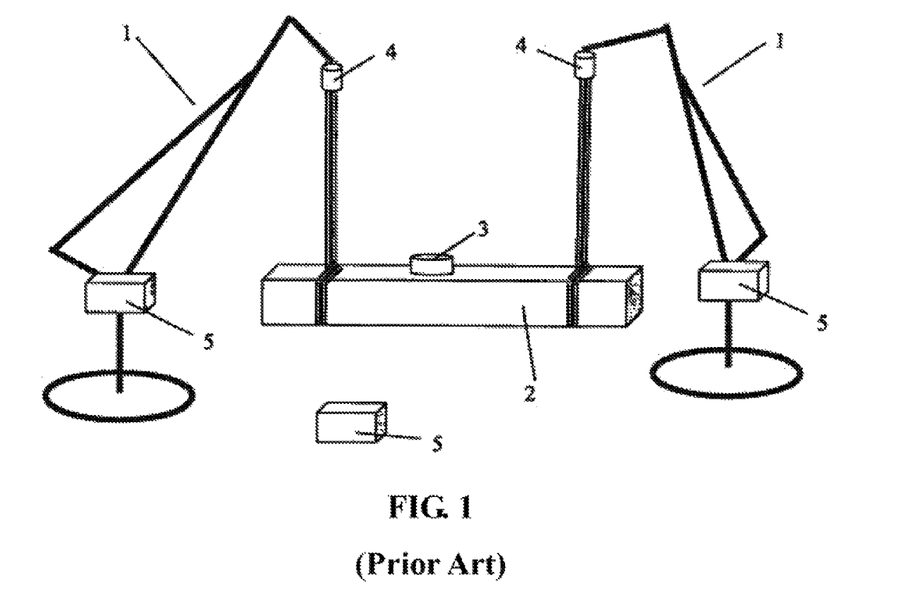
FIG. 1 is a structural schematic view showing the monitoring of the cranes' collaborative hoisting.

The crane requires vertical lifting as the deviation angle of hook shall not exceed 3 degrees when a work-piece is lifted by the mobile crane, but the driver cannot determine whether the hook is in the vertical position for lack of the display on the crane to show vertical hoisting. Especially when collaboratively hoisting, the hoisting commander instructs the drivers to operate and eliminate the load's swing angle with the information from whom monitors the load's angle, and instructs the drivers to operate and make balance of load weight with the information from whom monitors the load's gesture. It is neither timely nor accurate to do that. Here is a system for monitoring the hoisting of cranes, as is shown in FIG. 1. Two vertical measurement devices 4 are fixed to measure the relative vertical gesture between the hoisted object 2 and crane 1, and one horizontal measurement device 3 are fixed to measure the horizontal gesture of the hoisted object 2. The vertical measurement device 4 and horizontal measurement device 3 are respectively connected to measurement monitoring devices 5 via signal chains. The key technologies of the foresaid system are unclear. For example, it is just an assumption that the vertical measurement device 4 is used to measure the relative vertical gesture between the hoisted object 2 and crane 1, and it does not provide a solution of how to install the vertical measurement device 4 on the lifting pulley block; It is unclear to measure the horizontal gesture of the hoisted object 2 by the horizontal measurement device 3, such as how to set the horizontal gesture of boiler if the hoisting object is a boiler, and how to set the horizontal gesture of tower equipment when adopting two cranes to slidingly hoist or three cranes to hoist. Here is a device to dynamically display the hoisting risk in the collaborative crane, which adopts one wireless camera with three switchable channels and one receiver with a display matched with the wireless camera; the display of receiver in the collaborative crane cab displays the load's swing angle and weight which are already displayed in the native crane cab and transmitted by the wireless camera. But this collaborative displaying solution does not apply to the crane without displaying the load's swing angle and weight, especially there is no display set in the crane so far. Therefore, it is just a assumption too. Even if each crane is equipped with a display to show the load's swing angle and weight, it is difficult to get the load's swing angle and weight by the same monitoring device, which seriously affects the comparability between the native crane and the collaborative crane; and the monitoring method is not clear.

SUMMARY OF THE INVENTION

One purpose of the present invention is to prevent the oblique hoisting, to control the deflection of load, to achieve the vertical hoisting, especially to provide an apparatus for monitoring the swing angle, weight or gesture for the crane's hoisting which can be applied to both single-crane hoisting and multiple-crane hoisting.

The other purpose of the present invention is to provide a crane which comprises aforesaid apparatus.

The load's swing angle hereof is the angle of the action line of lifting force through the lifting pulley block of hook deviating from the plumb line which is also called the deviation angle of hook; the guard plate of the movable pulley hereof is the plate which is located on either side of the movable pulley or supports the shaft of movable pulley or the shaft of hook, including guard plate, clamp plate, yoke plate and junction plate.

Both single-crane hoisting and multiple-crane hoisting are the basic hoisting operation of mobile or construction crane. The multiple-cranes hoisting here means adopting two or three cranes to hoist because the independent hoisting points with clear forces are no more than three. According to the hoisting mathematical model, one risk of multiple-crane hoisting is from the non-vertical hoisting, which exists in all types of the crane hoisting; the other risk of multiple-crane hoisting is from the abnormal change of crane load's weight, which only exists in two main cranes hoisting or two main cranes and one auxiliary crane hoisting, and does not exist in one main crane and one auxiliary crane hoisting or one main crane and two auxiliary cranes hoisting or single-crane hoisting. The risk of abnormal change of crane load's weight between two main cranes comes from the slope of the link line between the two main cranes' hoisting points deviating from the design value or the ratio of two main cranes' load weight exceeding the design value. After the positions of three cranes' hoisting points of two main cranes and one auxiliary crane are determined, operate the cranes by comparison of the change of two main cranes' load or with the goal of keeping the slope of the link line between the two main cranes' hoisting points when the loads of two main cranes' hoisting points are abnormally changing. Therefore, it can overcome the risks of multiple-crane hoisting by monitoring the load's swing angle and weight to avoid the abnormal change of two cranes' hoisting points, as well as by monitoring the gesture of the link line between the two cranes' hoisting points; and it has general applicability to two or three cranes' hoisting with clear forces.

The multiple-crane hoisting requires two or three cranes to collaboratively hoist, and the two cranes are collaborative partners to each other when controlling the change of cranes' load weight or swing angle. For example, the two main cranes are collaborative partners to each other when using two main cranes to slidingly hoist; the main crane and the auxiliary crane are collaborative partners to each other when controlling the variation of cranes' load swing angle. When using one main crane and one auxiliary crane to hoist a vertical load, the change of their load's weight is determined by hoisting plan (that is, the relative position between the hoisting points and the load); thus, what it needs is to monitor the change of their load's swing angle. It can operate the cranes to achieve a vertical hoist on condition that the load's swing angle of the auxiliary crane is not greater than the allowable value, for the load's swing angles of main crane and auxiliary crane are inversely proportional to the load's weights shared by them. The effective way to eliminate the load's swing angles is to operate the cranes on the basis of the real-time display of the load's swing angles. It can operate the cranes on the basis of the real-time ratio of their loads to make balance of load distribution. For example, the ratio of their load is normally 1, and then the drivers can operate their cranes with the goal of the load ratio 1 to keep balance.

In the first solution, the present invention provides an apparatus for monitoring the swing angle and weight of the crane load, comprising:
(1) a monitoring device of the crane load's swing angle installed as follows:
on the outside of the guard plate of the movable pulley of the lifting pulley block of the crane, or on the inside vacancy between the two length-extended sides of the guard plate of which:
① a platform fixed, whose surface becomes a horizontal plane when the crane load's swing angle is 0 degree, thereon an angle measuring instrument is installed;
② a wireless swing angle transmitter with two channels switched by a remote controller which is positioned in the crane cab, to transmit the crane load's swing angle signals which are generated by the angle measuring instrument, as well as two wireless swing angle receivers with two switchable channels installed in the crane cab to receive the crane load's swing angle signals;
or a wireless swing angle transmitter with three channels switched by a remote controller which is positioned in the crane cab, to transmit the crane load's swing angle signals which are generated by the angle measuring instrument, as well as three wireless swing angle receivers with three switchable channels installed in the crane cab to receive the crane load's swing angle signals;
(2) a monitoring device of the crane load's weight installed as follows:
① a load weight detector installed on the crane, meanwhile a wireless load weight transmitter with two channels switched by a remote controller which is positioned in the crane cab, to transmit the crane load's weight signals which are generated by the load weight detector, as well as two wireless load weight receivers with two switchable channels installed in the crane cab to separately receive the native crane's load weight signals and the collaborative crane's load weight signals;
or a load weight detector installed on the crane, meanwhile a wireless load weight transmitter with three channels switched by the remote controller which is positioned in the crane cab, to transmit the crane load's weight signals which are generated by the load weight detector, as well as one wireless load weight receiver with three switchable channels to receive the native crane's load weight signals and two wireless load weight receivers with three switchable channels to receive the collaborative crane's load weight signals which are all installed in the crane cab;
② at least one load ratio processing monitor installed in the crane cab to display the real-time ratio of load weight, the two inputs of which are respectively connected to the output of the wireless load weight receiver receiving the native crane's load weight signals and the output of the wireless load weight receiver receiving the collaborative crane's load weight signals.

Preferably, a magnetism measuring instrument is also installed on the platform surface.

Preferably, the angle measuring instrument is a tri-axial accelerometer, and the magnetism measuring instrument is a tri-axial magnetometer.

Preferably, the native crane and the collaborative crane are furnished with the same load weight detectors, to improve the comparability of the native crane's load and the collaborative crane's load. For instance, both the load weight detector of the native crane and the load weight detector of the collaborative crane are a ring pad type of weighing sensor which is fixed in between the fixing nut of the hook head and the connecting beam.

Preferably, the load ratio processing monitor has a liquid-crystal display (LCD) to show the ratio of the collaborative crane's load weight and the native crane's load weight. The collaborative crane's load weight and the native crane's load weight are processed by the computer of the load ratio processing monitor, and the LCD displays the real-time ratio. In addition, the load ratio processing monitor also has a sound-light alarm to warn the driver about the overrun ratio.

According to the hoisting mathematical model, the abnormal change of two cranes' load with clear forces is equal to the slope of the link line between two hoisting points deviating from the design value. Therefore, the drivers can operate the cranes to make balance of load distribution by the ratio of cranes' load weight or by monitoring the slope. When the link line of two hoisting points is horizontal, the wireless uniaxial inclinometer can be horizontally fixed on the hoisted object, and the axis of which is parallel to the link line. When the link line of two hoisting points is not horizontal, the wireless uniaxial inclinometer still can be fixed on the hoisted object; and the crane cab is equipped with a wireless gesture receiver to receive the gesture signals from the wireless uniaxial inclinometer. With the slope of the link line between two hoisting points unchanged in the hoisting, the horizontal projection line of the link line translates at the same speed when the link line translates in its vertical plane. Therefore the wireless uniaxial inclinometer still can be applied, which is horizontally installed on the hoisted object under the condition that its sensitive axis is paralleled to the horizontal projection line of the link line. At this point, the slope of the link line is design value, and the wireless uniaxial inclinometer displays 0 degree. With the wireless uniaxial inclinometer horizontal in the hoisting, two hoisting points lift synchronously to overcome the deviation of the slope of the link line from the design value.

In the second solution, the present invention provides an apparatus for monitoring the swing angle and gesture of the collaborative crane load, comprising: a monitoring device of the collaborative crane load's swing angle or a monitoring device of the collaborative crane load's gesture installed in the crane, or both installed in the crane;
(1) the monitoring device of the collaborative crane load's swing angle, including:
① a platform fixed on the inside vacancy between the two length-extended sides of the guard plate of the movable pulley of the lifting pulley block of the crane, whose surface becomes a horizontal plane when the crane load's swing angle is 0 degree, thereon an angle measuring instrument is installed;
② a wireless swing angle transmitter with two channels fixed on the inside vacancy between the two length-extended sides of the guard plate of the movable pulley of the lifting pulley block of the crane, the two channels are switched by a remote controller which is positioned in the crane cab, to transmit the crane load's swing angle signals which are generated by the angle measuring instrument, as well as two wireless swing angle receivers with two switchable channels installed in the crane cab to receive the crane load's swing angle signals; or a wireless swing angle transmitter with three channels fixed on the inside vacancy between the two length-extended sides of the guard plate of the movable pulley of the lifting pulley block of the crane, the three channels are switched by the remote controller which is positioned in the crane cab, to transmit the crane load's swing angle signals which are generated by the angle measuring instrument, as well as three wireless swing angle receivers with three switchable channels installed in the crane cab to receive the crane load's swing angle signals;

(2) the monitoring device of the collaborative crane load's gesture, including:

① a wireless uniaxial inclinometer installed on the load, the sensitive axis of which is parallel to the horizontal projection line of the link line between the two controlled cranes' hoisting points, to measure the gesture of the crane load;

② a wireless gesture receiver installed in the crane cab, to receive the gesture signals from the wireless uniaxial inclinometer.

Preferably, a magnetism measuring instrument is also installed on the platform surface.

Preferably, the angle measuring instrument is a dual-axis inclinometer, and the magnetism measuring instrument is a two-axis magnetometer.

Preferably, the wireless uniaxial inclinometer is fixed by magnetic adsorption, the panel of which is always upward under the action of its hinged joint and its own weight.

In the third solution, the present invention provides a method for monitoring the swing angle, weight and gesture of the crane load, adopting the apparatus as described above, and comprising:

(1) the use of apparatus, including:

① when using a single crane installed with an apparatus for monitoring the swing angle and weight of the crane load to hoist: switch on the wireless swing angle transmitter with one occupied channel and the wireless load weight transmitter with one occupied channel by a remote controller which is positioned in the crane cab, meanwhile only switch on the wireless swing angle receiver and the wireless load weight receiver which respectively receive the corresponding signals of the native crane; when using multiple cranes installed with the corresponding apparatus to collaboratively hoist: separately switch on each wireless swing angle transmitter with one occupied channel and each wireless load weight transmitter with one occupied channel by the remote controllers which are positioned in each crane cab, switch on the wireless swing angle receiver and the wireless load weight receiver which respectively receive the corresponding signals of the native crane, and dynamically display the native crane load's swing angle and weight out of the native crane cab, meanwhile switch on the wireless swing angle receivers and the wireless load weight receivers which respectively receive the corresponding signals of the collaborative cranes, and dynamically display the collaborative crane load's swing angle and weight in the native crane cab;

② when using a single crane installed with an apparatus for monitoring the swing angle and gesture of the collaborative crane load to hoist: switch on the wireless swing angle transmitter with one occupied channel by a remote controller which is positioned in the crane cab, and only switch on the wireless swing angle receiver which receives the swing angle signal of the native crane; when using multiple cranes installed with the corresponding apparatus to collaboratively hoist: separately switch on each wireless swing angle transmitter with one occupied channel by the remote controllers which are positioned in each crane cab, switch on the wireless swing angle receivers which receive the swing angle signal of the native crane, and dynamically display the native crane load's swing angle out of the native crane cab, switch on the wireless swing angle receivers which receive the swing angle signal of the collaborative cranes, and dynamically display the collaborative crane load's swing angle in the native crane cab, meanwhile install the wireless uniaxial inclinometer on the load, the sensitive axis of wireless uniaxial inclinometer is parallel to the horizontal projection line of the link line between the two controlled cranes' hoisting points, and the wireless gesture receiver in the crane cab displays the real-time gesture of the load;

(2) the ways to collaboratively hoist, including:

① when using two main cranes to hoist or slidingly hoist, operate the cranes to achieve a vertical hoist by making a comparison between the load's swing angles of two cranes, and operate the cranes to make balance of the weight distribution according to the load ratio of two cranes, or operate the cranes to keep the wireless uniaxial inclinometer horizontal for making balance of the weight distribution by monitoring the slope of the link line between the two cranes' hoisting points;

② when using one main crane and one auxiliary crane to hoist, operate the cranes to achieve a vertical hoist on condition that the load's swing angle of the auxiliary crane is not greater than the allowable value;

③ when using two main cranes and one auxiliary crane to hoist, operate the cranes to achieve a vertical hoist by making a comparison between the load's swing angles of two main cranes and on condition that the load's swing angle of the auxiliary crane is not greater than the allowable value, meanwhile operate the cranes to make balance of the weight distribution according to the load ratio of two main cranes, or operate the cranes to keep the wireless uniaxial inclinometer horizontal for making balance of the weight distribution by monitoring the slope of the link line between the two main cranes' hoisting points;

④ when using three cranes with the balanced load to hoist, operate the cranes to achieve a vertical hoist by making a comparison between the load's swing angles of three cranes, meanwhile make sure that one of the cranes is active crane and the rest cranes are positive cranes, and keep the load ratio of the positive cranes in the scheduled interval while the active crane is hoisting.

In the fourth solution, the present invention provides a crane, comprising: any apparatus for monitoring the swing angle and weight of the crane load as described above, or any apparatus for monitoring the swing angle and gesture of the collaborative crane load as described above.

Disclosed in the present invention is a crane, method and apparatus for monitoring the swing angle, weight or gesture of the crane load, belonging to the technical field of crane; the purpose of the present invention is to prevent the oblique hoisting, to control the deflection of load, to achieve the vertical hoisting, especially to provide an apparatus for monitoring the swing angle, weight or gesture for the crane's hoisting which can be applied to both single-crane hoisting and multiple-crane hoisting, and to provide a crane which comprises aforesaid apparatus; when hoisting a load, the swing angle, weight or gesture are displayed in both the native crane cab and the collaborative crane cab by wireless transmission and switching channels in the cab; then, not only can the drivers operate the cranes to eliminate the deflection of load and achieve the vertical hoisting according to the load's swing angle of each crane displayed on the screen, but also operate the cranes to make balance of weight distribution according to the real-time ratio of load weight or load gesture. The present invention can be applied to crane, especially various types of mobile crane or construction crane.

DETAILED DESCRIPTION OF THE INVENTION

Figure 2:
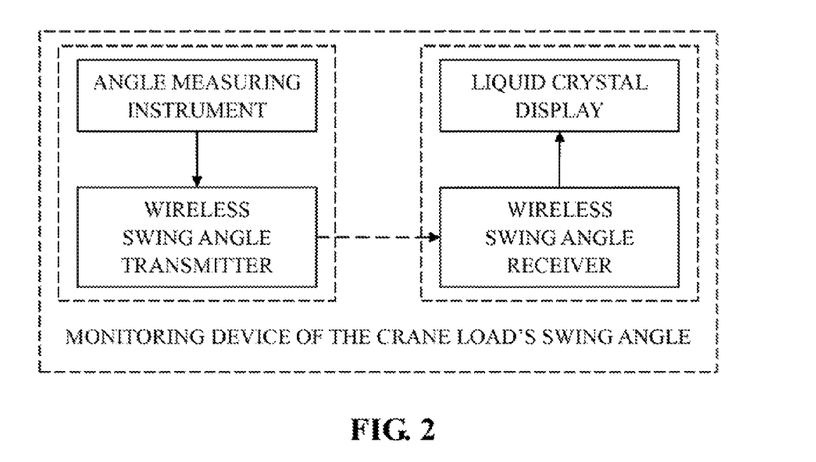
FIG. 2 is a block diagram showing the monitoring of the swing angle of the crane load.

First, there is disclosed an apparatus for monitoring the swing angle and weight of the crane load, comprising:

(1) a monitoring device of the crane load's swing angle installed as follows:

① firstly, respectively extending 30 cm of the two sides of the guard plate of the movable pulley of the lifting pulley block of the mobile crane; secondly, there is also a beam fixed on the bottom of the guard plate; thirdly, a hook is fixed on the beam by the nut, which can rotate around the axis of the hook's handle with bearings. As the distance between the movable pulley and the hook's head is widen, there is a space provided to install an angle measuring instrument which is located on the inside vacancy between the two length-extended sides of the guard plate. Meanwhile, the two sides of the guard plate can be made of fiber reinforced plastics in order to reduce the surrounding strong magnetic interference and benefit the wireless emission of the measured signal.

② fixing a nonmagnetic platform on the inside vacancy between the two length-extended sides of the guard plate, the upper and lower surfaces of which are parallel and become horizontal when the crane load's swing angle is 0 degree. Establishing one space rectangular coordinate at the centre of the lower platform surface and fixing a MEMS tri-axial accelerometer (that is, an angle measuring instrument) thereon, establishing another space rectangular coordinate at the centre of the upper platform surface and fixing a tri-axial magnetometer (that is, a magnetism measuring instrument) thereon, and the Z axes of the tri-axial magnetometer and the tri-axial accelerometer are located in the same line, the X axes and Y axes of them are respectively parallel. There is a high-storage battery installed on the inside vacancy of the guard plate to provide electricity for the device.

③ fixing a wireless swing angle transmitter with two channels on the inside vacancy of the guard plate, to transmit the crane load's swing angle signals which are generated by the angle measuring instrument; the two channels of the wireless swing angle transmitter are switched by a remote controller which is positioned in the crane cab. Two wireless swing angle receivers with two switchable channels are installed in the crane cab to receive the crane load's swing angle signals.

The angles between X axis, Y axis and horizontal plane respectively reflect the X axial component and Y axial component of the swing angle of the crane load. Each axial measuring value can be considered as the corresponding axial component of gravity acceleration (g) when the hook slowly moves. According to the principle of space vector modulation, the X axial angle ($\alpha x$) and the Y axial angle ($\alpha y$) are respectively calculated as follows:

$$\alpha_x = \arcsin \frac{g_x}{\sqrt{g_x^2 + g_y^2 + g_z^2}}, \quad \alpha_y = \arcsin \frac{g_y}{\sqrt{g_x^2 + g_y^2 + g_z^2}}$$

In these formulas, $g_x$, $g_y$ and $g_z$ are the measuring values of the MEMS tri-axial accelerometer. The tri-axial magnetometer can output the current magnetic field intensity values of three axes pairwise orthogonal in the stereoscopic space. The rotation angle of the hook plane is determined by the tri-axial magnetometer, and calculated as follows:

$$\phi = \arctan(Y_H)/(X_H)$$

In this formula, $X_H$ and $Y_H$ are respectively the X axial and Y axial measuring value of the tri-axial magnetometer.

If the initial direction of the hook is the North Magnetic Pole, we can determine the rotation angle of the hook with a load relative to the North Magnetic Pole. Due to the surround strong magnetic interference, the rotation angle should be compensated the error. The present invention adopts the MEMS tri-axial accelerometer, the tri-axial magnetometer and the wireless swing angle transmitter which includes an information processing module and a data transmission module. The information processing module uses a Single Chip Microcomputer to collect the sensor signals and analyze the state of the load, and the data transmission module sends the angle signals.

The wireless swing angle receiver contains a same data transmission module which receives the angle signals and sends these signals to liquid-crystal display. Therefore, the load's swing angle and azimuth angle can be real-timely showed in the crane cab. The driver can find out the direction by observing the scale of electronic compass in the cab.

Figure 3:
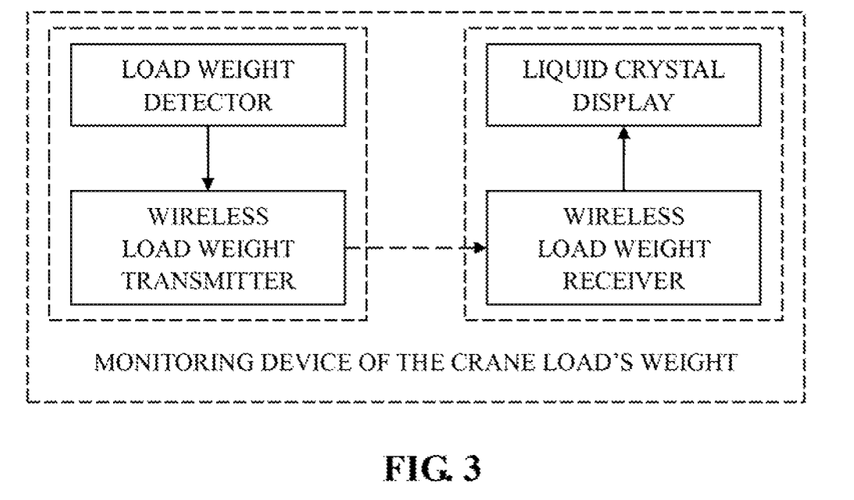
FIG. 3 is a block diagram showing the monitoring of the weight of the crane load.

(2) a monitoring device of the crane load's weight installed as follows:

① firstly, fixing on a ring pad type of weighing sensor (that is, a load weight detector) between the fixing nut of the hook head and the connecting beam; secondly, fixing a wireless load weight transmitter with two channels on the inside vacancy of the guard plate, to transmit the crane load's weight signals which are generated by the load weight detector; the two channels of the wireless load weight transmitter are switched by a remote controller which is positioned in the crane cab.

② two wireless load weight receivers with two switchable channels are installed in the crane cab to separately receive the native crane's load weight signals and the collaborative crane's load weight signals. One load ratio processing monitor is installed in the crane cab to display the real-time ratio of load weight, the two inputs of which are respectively connected to the output of the wireless load weight receiver receiving the native crane's load weight signals and the output of the wireless load weight receiver receiving the collaborative crane's load weight signals.

The ring pad type of weighing sensor converts the load weight to analog voltage signal which are amplified, filtered and converted to the corresponding data signal by the data acquisition board of the wireless load weight transmitter; the data signal is wirelessly transmitted to the data processing board of the wireless load weight receiver and displayed by the screen. Meanwhile, the data signal from the native crane is also input to the load ratio processing monitor, and compared with the data signal from the collaborative crane by personal computer (PC). The ratio of the collaborative crane's load weight and the native crane's load weight is real-timely showed by the liquid-crystal display (LCD) of the load ratio processing monitor. In addition, the load ratio processing monitor also has a sound-light alarm to warn the driver about the overrun ratio. In order to improve the comparability of the native crane's load and the collaborative crane's load, the native crane and the collaborative crane are furnished with the same load weight detectors.

Second, there is disclosed an apparatus for monitoring the swing angle and gesture of the collaborative crane load, comprising:

(1) a monitoring device of the collaborative crane load's swing angle, including:

① firstly, respectively extending 30 cm of the two sides of the guard plate of the movable pulley of the lifting pulley block of the mobile crane; secondly, there is also a beam fixed on the bottom of the guard plate; thirdly, a hook is fixed on the beam by the nut, which can rotate around the axis of the hook's handle with bearings. As the distance between the movable pulley and the hook's head is widen, there is a space provided to install an angle measuring instrument which is located on the inside vacancy between the two length-extended sides of the guard plate. Meanwhile, the two sides of the guard plate can be made of fiber reinforced plastics in order to reduce the surrounding strong magnetic interference and benefit the wireless emission of the measured signal.

② fixing a nonmagnetic platform on the inside vacancy between the two length-extended sides of the guard plate, the upper and lower surfaces of which are parallel and become horizontal when the crane load's swing angle is 0 degree. Establishing one cross rectangular coordinate at the centre of the lower platform surface and fixing a MEMS dual-axis inclinometer (that is, an angle measuring instrument) thereon to detect the two dimensional angle of the platform surface relative to the horizontal plane, establishing another cross rectangular coordinate at the centre of the upper platform surface and fixing a two-axis magnetometer (that is, a magnetism measuring instrument) thereon, and the X axes and Y axes of the two-axis magnetometer and the dual-axis inclinometer are respectively parallel. There is a high-storage battery installed on the inside vacancy of the guard plate to provide electricity for the device.

③ fixing a wireless swing angle transmitter with two channels on the inside vacancy of the guard plate, to transmit the crane load's swing angle signals which are generated by the angle measuring instrument; the two channels of the wireless swing angle transmitter are switched by a remote controller which is positioned in the crane cab. Two wireless swing angle receivers with two switchable channels are installed in the crane cab to receive the crane load's swing angle signals.

The present invention adopts sensor module, wireless transmitting module, wireless receiving module (including antenna) and personal computer (PC) to wirelessly acquire the dual-axis angle signal. The sensor module and the wireless transmitting module (including antenna) are fixed on the inside vacancy between the two length-extended sides of the guard plate of the movable pulley. The wireless receiving module (including antenna) and PC are installed in the crane cab. As the angle between the platform surface and horizontal plane is equal to the swing angle of the crane load, the swing angle (α) can be calculated as follows:

$$(\sin \alpha)^2 = (\sin \alpha x)^2 + (\sin \alpha y)^2$$

In this formula, αx and αy are respectively the X axial and Y axial component of the swing angle. Because the swing angle is very small, for example 6° equals 0.1047, this formula can be instead of $(\alpha x)^2 + (\alpha y)^2 \approx (\alpha)^2$.

The rotation angle of the hook plane is determined by the two-axis magnetometer, and calculated as follows:

$$\varphi = \arctan(Y_H)/(X_H)$$

In this formula, $X_H$ and $Y_H$ are respectively the X axial and Y axial measuring value of the two-axis magnetometer.

If the initial direction of the hook is the North Magnetic Pole, we can determine the rotation angle of the hook with a load relative to the North Magnetic Pole. Due to the surround strong magnetic interference, the rotation angle should be compensated the error.

The present invention adopts the wireless swing angle transmitter which includes an information processing module and a data transmission module. The information processing module uses a Single Chip Microcomputer to collect the sensor signals and analyze the state of the load, and the data transmission module sends the angle signals. The wireless swing angle receiver contains a same data transmission module which receives the angle signals and sends these signals to liquid-crystal display. Therefore, the load's swing angle and azimuth angle can be real-timely showed in the crane cab. The driver can find out the direction by observing the scale of electronic compass in the cab.

Figure 4:
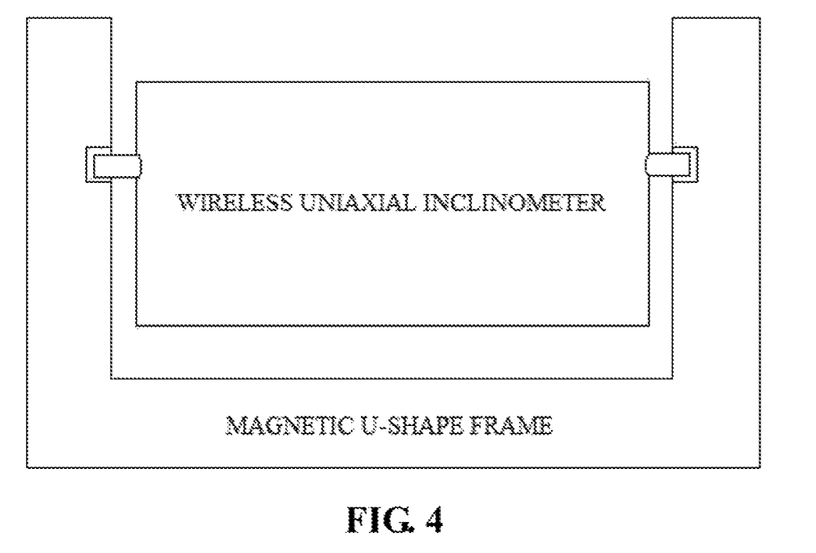
FIG. 4 is a structural schematic view of the hinging of the wireless uniaxial inclinometer and U-shape frame.

(2) the monitoring device of the collaborative crane load's gesture, including:

① preparing a wireless uniaxial inclinometer which are fixed by magnetic adsorption and can adjust direction itself, to measure the gesture of the crane load. As shown in FIG. 4, the two ends of wireless uniaxial inclinometer is hinged with a magnetic U-shape frame. Under the action of the hinged joint and its own weight, the panel of wireless uniaxial inclinometer is always upward. There is a magnet fixed on the bottom and lower front of U-shape frame in order to fix the U-shape frame on the load.

② a wireless gesture receiver installed in the crane cab, to receive the gesture signals from the wireless uniaxial inclinometer.

③ when monitoring the weight distribution of two cranes' collaborative hoisting, horizontally fixing the wireless uniaxial inclinometer on the load, and the sensitive axis of which is parallel to the horizontal projection line of the link line between the two controlled cranes' hoisting points; in the meantime, the slope of the link line between the two cranes' hoisting points is design value, and the wireless uniaxial inclinometer displays 0 degree.

Third, there is disclosed another apparatus for monitoring the swing angle and weight of the crane load, comprising:

(1) a monitoring device of the crane load's swing angle installed as follows:

① fixing a platform on the outside of the guard plate of the movable pulley of the lifting pulley block of the crane, the top surface of which becomes horizontal when the crane load's swing angle is 0 degree. Establishing the cross rectangular coordinate at the centre of the platform surface where a dual-axis digital inclinometer (that is, an angle measuring instrument) is fixed on.

② fixing a wireless camera with two switchable channels on the outside of the guard plate of the movable pulley, and the camera aims at the panel of the dual-axis digital inclinometer to transmit the crane load's swing angle signals which are generated by the angle measuring instrument; the two channels of the wireless swing angle transmitter are switched by a remote controller which is positioned in the crane cab. There is a high-storage battery installed on the inside vacancy of the guard plate to provide electricity for the device.

③ Two wireless swing angle receivers with two switchable channels are installed in the crane cab to receive the crane load's swing angle signals.

(2) a monitoring device of the crane load's weight installed as follows:
① firstly, fixing on a fixed pulley seat type of weighing sensor (that is, a load weight detector) between the fixed pulley at the tail of the crane jib and the fixing point of the crane jib, to transmit the crane load's weight signals which are generated by the load weight detector. Meanwhile, fixing a wireless load weight transmitter with two switchable channels at the tail of the crane jib; the two channels of the wireless load weight transmitter are switched by a remote controller which is positioned in the crane cab.
② two wireless load weight receivers with two switchable channels are installed in the crane cab to separately receive the native crane's load weight signals and the collaborative crane's load weight signals. One load ratio processing monitor is installed in the crane cab to display the real-time ratio of load weight, the two inputs of which are respectively connected to the output of the wireless load weight receiver receiving the native crane's load weight signals and the output of the wireless load weight receiver receiving the collaborative crane's load weight signals.

The fixed pulley seat type of weighing sensor converts the load weight to analog voltage signal which are amplified, filtered and converted to the corresponding data signal by the data acquisition board of the wireless load weight transmitter; the data signal is wirelessly transmitted to the data processing board of the wireless load weight receiver and displayed by the screen. Meanwhile, the data signal from the native crane is also input to the load ratio processing monitor, and compared with the data signal from the collaborative crane by personal computer (PC). The ratio of the collaborative crane's load weight and the native crane's load weight is real-timely showed by the liquid-crystal display (LCD) of the load ratio processing monitor. In addition, the load ratio processing monitor also has a sound-light alarm to warn the driver about the overrun ratio. In order to improve the comparability of the native crane's load and the collaborative crane's load, the native crane and the collaborative crane are furnished with the same load weight detectors.

There is disclosed a method for monitoring the swing angle, weight and gesture of the crane load, adopting the apparatus as described above, and comprising:
(1) the use of apparatus, including:
① when using a single crane installed with an apparatus for monitoring the swing angle and weight of the crane load to hoist: switch on the wireless swing angle transmitter with one occupied channel and the wireless load weight transmitter with one occupied channel by a remote controller which is positioned in the crane cab, meanwhile only switch on the wireless swing angle receiver and the wireless load weight receiver which respectively receive the corresponding signals of the native crane; when using multiple cranes installed with the corresponding apparatus to collaboratively hoist: separately switch on each wireless swing angle transmitter with one occupied channel and each wireless load weight transmitter with one occupied channel by the remote controllers which are positioned in each crane cab, switch on the wireless swing angle receiver and the wireless load weight receiver which respectively receive the corresponding signals of the native crane, and dynamically display the native crane load's swing angle and weight out of the native crane cab, meanwhile switch on the wireless swing angle receivers and the wireless load weight receivers which respectively receive the corresponding signals of the collaborative cranes, and dynamically display the collaborative crane load's swing angle and weight in the native crane cab;

② when using a single crane installed with an apparatus for monitoring the swing angle and gesture of the collaborative crane load to hoist: switch on the wireless swing angle transmitter with one occupied channel by a remote controller which is positioned in the crane cab, and only switch on the wireless swing angle receiver which receives the swing angle signal of the native crane; when using multiple cranes installed with the corresponding apparatus to collaboratively hoist: separately switch on each wireless swing angle transmitter with one occupied channel by the remote controllers which are positioned in each crane cab, switch on the wireless swing angle receivers which receive the swing angle signal of the native crane, and dynamically display the native crane load's swing angle out of the native crane cab, switch on the wireless swing angle receivers which receive the swing angle signal of the collaborative cranes, and dynamically display the collaborative crane load's swing angle in the native crane cab, meanwhile install the wireless uniaxial inclinometer on the load, the sensitive axis of wireless uniaxial inclinometer is parallel to the horizontal projection line of the link line between the two controlled cranes' hoisting points, and the wireless gesture receiver in the crane cab displays the real-time gesture of the load;

(2) the ways to collaboratively hoist, including:
① when using two main cranes to hoist or slidingly hoist, operate the cranes to achieve a vertical hoist by making a comparison between the load's swing angles of two cranes, and operate the cranes to make balance of the weight distribution according to the load ratio of two cranes, or operate the cranes to keep the wireless uniaxial inclinometer horizontal for making balance of the weight distribution by monitoring the slope of the link line between the two cranes' hoisting points;
② when using one main crane and one auxiliary crane to hoist, operate the cranes to achieve a vertical hoist on condition that the load's swing angle of the auxiliary crane is not greater than the allowable value;
③ when using two main cranes and one auxiliary crane to hoist, operate the cranes to achieve a vertical hoist by making a comparison between the load's swing angles of two main cranes and on condition that the load's swing angle of the auxiliary crane is not greater than the allowable value, meanwhile operate the cranes to make balance of the weight distribution according to the load ratio of two main cranes, or operate the cranes to keep the wireless uniaxial inclinometer horizontal for making balance of the weight distribution by monitoring the slope of the link line between the two main cranes' hoisting points;
④ when using three cranes with the balanced load to hoist, operate the cranes to achieve a vertical hoist by making a comparison between the load's swing angles of three cranes, meanwhile make sure that one of the cranes is active crane and the rest cranes are positive cranes, and keep the load ratio of the positive cranes in the scheduled interval while the active crane is hoisting.

The above description of the disclosed embodiment enables the person skilled in the art to practice and use the application. Various modifications to these embodiments may be obvious to the person skilled in the art. The general principle defined therein may be implemented in other embodiments without departing from the spirit and scope of the application. Thus, the application is not limited to these embodiments illustrated herein, but conforms to a broadest scope consistent with the principle and novel features disclosed herein.

The invention claimed is:

1. An apparatus for monitoring the swing angle and the weight of a crane load, comprising:
a monitoring device of the crane load's swing angle installed as follows:
on the outside of a guard plate of a movable pulley of the lifting pulley block of the crane, or on the unoccupied place between the two length-extended sides of the guard plate;
wherein the monitoring device further comprises:
a platform fixed, whose surface becomes a horizontal plane when the crane load's swing angle is 0 degree, thereon an angle measuring instrument is installed,
a wireless swing angle transmitter with two channels switched by a remote controller which is positioned in a crane cab, to transmit the crane load's swing angle signals which are generated by the angle measuring instrument, as well as two wireless swing angle receivers with two switchable channels installed in the crane cab to receive the crane load's swing angle signals,
or a wireless swing angle transmitter with three channels switched by a remote controller which is positioned in the crane cab, to transmit the crane load's swing angle signals which are generated by the angle measuring instrument, as well as three wireless swing angle receivers with three switchable channels installed in the crane cab to receive the crane load's swing angle signals;
a monitoring device of the crane load's weight which further comprises:
a load weight detector installed on the crane, meanwhile a wireless load weight transmitter with two channels switched by a remote controller which is positioned in the crane cab, to transmit the crane load's weight signals which are generated by the load weight detector, as well as two wireless load weight receivers with two switchable channels installed in the crane cab to separately receive the crane's own load weight signals and a collaborative crane's load weight signals,
or a load weight detector installed on the crane, meanwhile a wireless load weight transmitter with three channels switched by the remote controller which is positioned in the crane cab, to transmit the crane load's weight signals which are generated by the load weight detector, as well as one wireless load weight receiver with three switchable channels to receive the crane's own load weight signals and two wireless load weight receivers with three switchable channels to receive the collaborative crane's load weight signals which are all installed in the crane cab,
at least one load ratio processing monitor installed in the crane cab to display the real-time ratio of load weight, the two inputs of which are respectively connected to the output of the wireless load weight receiver receiving the crane's own load weight signals and the output of the wireless load weight receiver receiving the collaborative crane's load weight signals.

2. The apparatus according to claim 1, wherein a magnetism measuring instrument is also installed on the platform surface.

3. The apparatus according to claim 2, wherein the angle measuring instrument is a tri-axial accelerometer, and the magnetism measuring instrument is a tri-axial magnetometer.

4. The apparatus according to claim 1, wherein the crane and the collaborative crane are furnished with a plurality of same load weight detectors.

5. The apparatus according to claim 1, wherein the load ratio processing monitor has a liquid-crystal display to show the ratio of the collaborative crane's load weight and the crane's own load weight.

6. An apparatus for monitoring the swing angle and gesture of the collaborative crane load, comprising:
a monitoring device of the collaborative crane load's swing angle or a monitoring device of the collaborative crane load's gesture installed in the crane, or both installed in the crane;
wherein the monitoring device of the collaborative crane load's swing angle further comprises:
a platform fixed on the unoccupied place between the two length-extended sides of the guard plate of a movable pulley of a lifting pulley block of the crane, whose surface becomes a horizontal plane when the crane load's swing angle is 0 degree, thereon an angle measuring instrument is installed,
a wireless swing angle transmitter with two channels fixed on the unoccupied place between the two length-extended sides of the guard plate of the movable pulley of the lifting pulley block of the crane, wherein the two channels are switched by a remote controller which is positioned in the crane cab, to transmit the crane load's swing angle signals which are generated by the angle measuring instrument, as well as two wireless swing angle receivers with two switchable channels installed in the crane cab to receive the crane load's swing angle signals,
or a wireless swing angle transmitter with three channels fixed on the unoccupied place between the two length-extended sides of the guard plate of the movable pulley of the lifting pulley block of the crane, wherein the three channels are switched by the remote controller which is positioned in the crane cab, to transmit the crane load's swing angle signals which are generated by the angle measuring instrument, as well as three wireless swing angle receivers with three switchable channels installed in the crane cab to receive the crane load's swing angle signals;
wherein the monitoring device of the collaborative crane load's gesture further comprises:
a wireless uniaxial inclinometer installed on the load, the sensitive axis of which is parallel to the horizontal projection line of the link line between the two controlled cranes' hoisting points, to measure the inclination angle of the crane load and transmit the crane load's inclination angle signals;
a wireless inclination angle receiver installed in the crane cab, to receive the crane load's inclination angle signals.

7. The apparatus according to claim 6, wherein a magnetism measuring instrument is also installed on the platform surface.

8. The apparatus according to claim 6, wherein the angle measuring instrument is a dual-axis inclinometer, and the magnetism measuring instrument is a two-axis magnetometer.

9. The apparatus according to claim 6, wherein the wireless uniaxial inclinometer is fixed by magnetic adsorption, the panel of which is always upward under the action of a hinged joint and the own weight.

10. A crane, comprising:
a plurality of apparatuses for monitoring the swing angle and weight of the crane load as recited in claim 1.

11. The apparatus according to claim 7, wherein the angle measuring instrument is a dual-axis inclinometer, and the magnetism measuring instrument is a two-axis magnetometer.

12. A crane, comprising a plurality of apparatuses for monitoring the swing angle and gesture of the collaborative crane load as recited in claim 6.

* * * * *